June 5, 1962          J. COLPO          3,037,792
TRACTOR-TRAILER CONNECTION DEVICE
Filed April 12, 1960          2 Sheets-Sheet 1
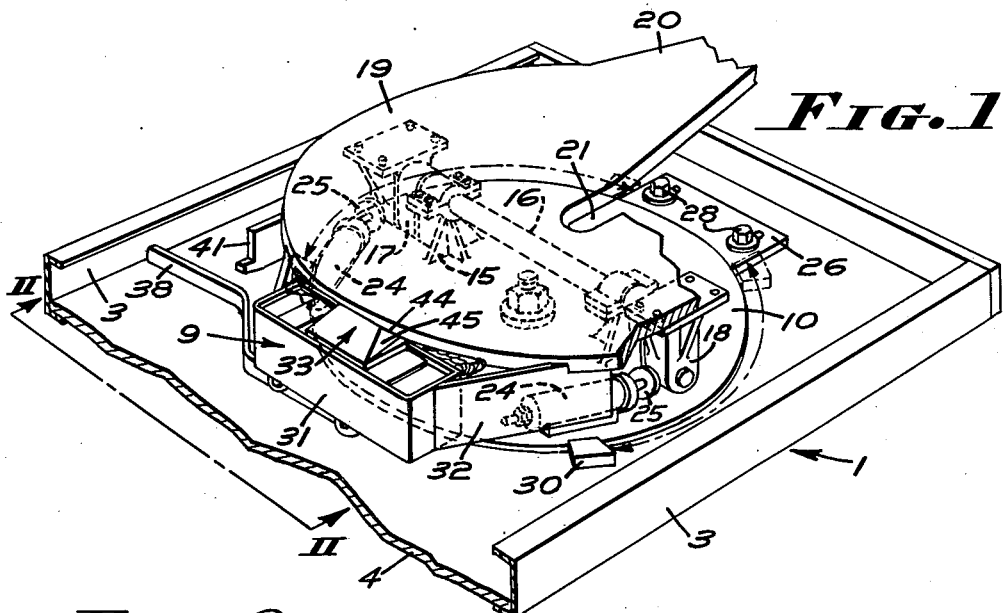
FIG. 1
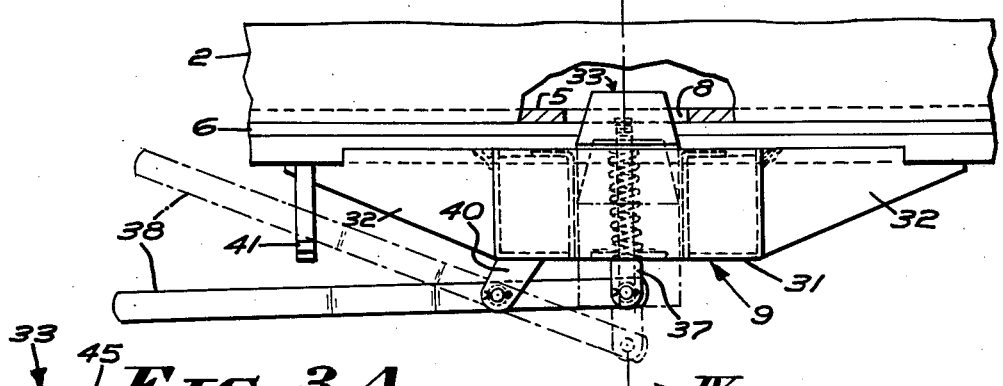
FIG. 2
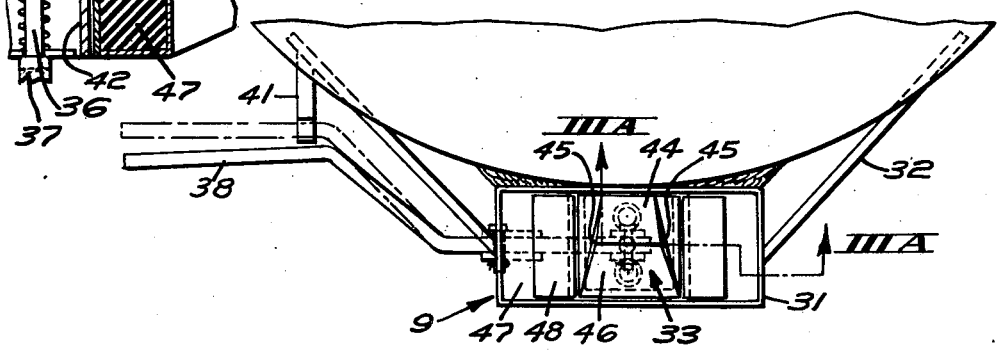
FIG. 3A
FIG. 3

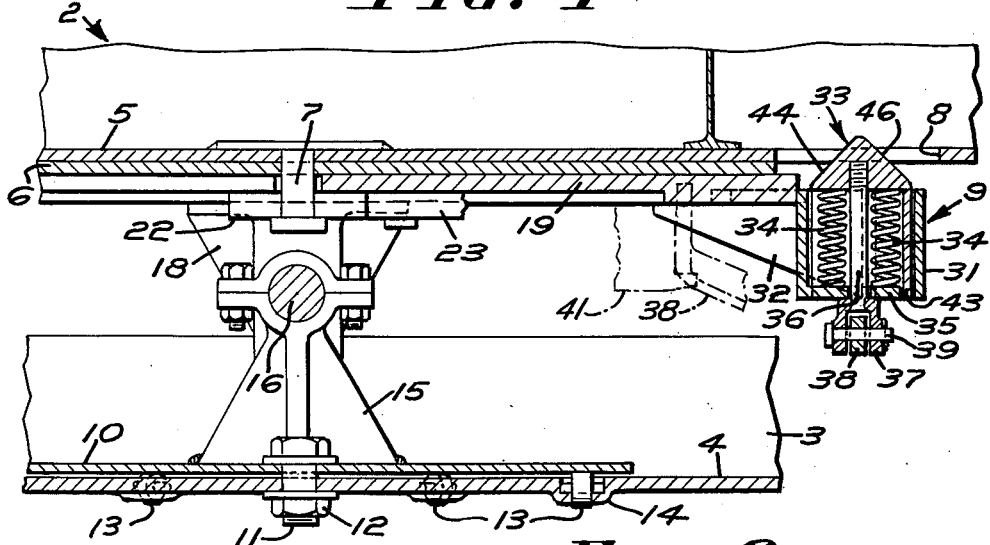
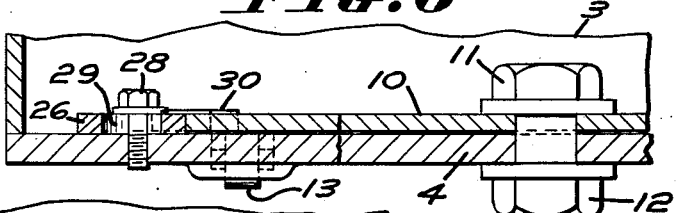
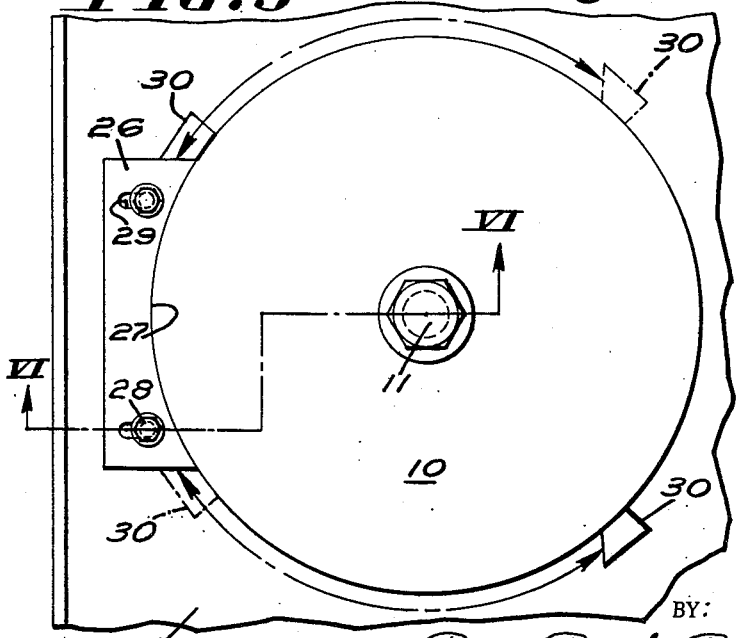
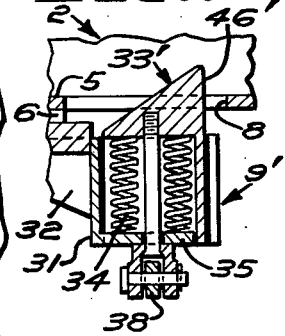
INVENTOR:
JESSE COLPO
BY:
Beau, Brooks, Buckley & Beau,
ATTORNEYS.

3,037,792
TRACTOR-TRAILER CONNECTION DEVICE
Jesse Colpo, 5 Poplar St., Newark, Del.
Filed Apr. 12, 1960, Ser. No. 21,817
11 Claims. (Cl. 280—432)

This invention relates to a new and useful connection device for supporting the forward end of a trailing vehicle, such as a trailer or semi-trailer, on the rearward end of a vehicle such as a tractor.

In my Patents 2,667,364, dated January 26, 1954 and 2,670,220, dated February 23, 1954, there are disclosed connection devices of a type having a base plate pivotally mounted on the tractor for rotation about a normally upright axis, and a trailer mounting plate connected by articulated arms to a shaft carried by the base plate, with the mounting plate normally being held against movement relative to the trailer, whereby the connection device and connected trailer move relative to the tractor.

In such an arrangement, the pivot pin connecting the base plate to the tractor, and its bushing, are subject to uneven wear because of the rearward pull exerted thereon by the trailing vehicle. As a result, it becomes necessary to repair or replace the bushing, which is inconvenient because the bushing is relatively inaccessible.

Accordingly, a primary object of this invention is to provide a bearing support relieving the thrust upon the pivot pin and its bushing, thereby to prolong the working life of these parts.

In addition, an important object of this invention is to provide a latch, for locking the trailer against rotation relative to the connection device, which can be selectively retracted and held in retracted position, which is cushioned against lateral shocks, and which incorporates cam means facilitating automatic latching engagement thereof with a trailer.

Still another object of my invention is to provide the foregoing in a construction characterized by its relative simplicity and low cost, and by its dependability and durability in operation.

In one aspect thereof, a connection device of my invention is characterized by the provision of a base plate pivotally connected to the tractor for rotation relative thereto about a normally upright axis, trailer supporting means carried by the base plate for connection to a trailer, and bearing shoe means carried by the tractor and bearing against the rearward edge of the base plate in supporting relation thereto.

In another aspect thereof, a connection device of my invention is characterized by the provision of a base plate pivotally connected to the tractor for rotation relative thereto about a normally upright axis, a trailer mounting plate carried by the base plate for rotation therewith about such upright axis, and a latch member carried by the mounting plate for holding a connected trailer against rotation relative to the mounting plate, the latch member being spring biased to project upwardly above the mounting plate into latching engagement with a connected trailer and having resiliently yieldable cushioning means laterally supporting the same on opposite sides thereof.

The foregoing and other objects, advantages and characterizing features of tractor-trailer connection device of my invention will become clearly apparent from a perusal of the ensuing detailed description of a presently preferred embodiment thereof, and a modified form of latch member, taken in conjunction with the accompanying drawings illustrating the same wherein like reference numerals denote like parts throughout the various views and wherein:

FIG. 1 is a fragmentary perspective view of a connection device of my invention, operatively installed on a tractor, with a portion of the trailer mounting plate being broken away to more clearly illustrate certain details;

FIG. 2 is a fragmentary, front elevational view of the latch mechanism of FIG. 1, showing a connected trailer supported on the mounting plate with a portion of the trailer broken away, and illustrating in full lines the latching position of the latch member and in phantom the retracted, unlatched position thereof, being taken about on line II—II of FIG. 1;

FIG. 3 is a fragmentary, top plan view of the latch mechanism of FIGS. 1 and 2, with the normal plan view position of the latch operating lever relative to its supporting bracket being illustrated in phantom;

FIG. 3A is a fragmentary, detail transverse sectional view of the latch mechanism being taken about on line IIIA—IIIA of FIG. 3;

FIG. 4 is a fragmentary, longitudinal sectional view of the connection device, being taken about on line IV—IV of FIG. 2;

FIG. 5 is a top plan view of the stabilizing base plate portion alone, showing the bearing shoe and the stop members;

FIG. 6 is an enlarged, fragmentary, longitudinal sectional view thereof, being taken about on line VI—VI of FIG. 5; and FIG. 7 is a fragmentary, longitudinal sectional view of a modified latch construction.

Referring now in detail to the accompanying drawing, there is shown a tractor 1 and a trailer 2, the tractor having at its rearward portion a pair of side frame members 3 with a floor member 4 extending therebetween. The trailer 2 has a floor 5, and a bearing or retainer plate 6 on the undersurface thereof, with a conventional king pin 7 extending through floor 5 and plate 6. Floor 5 is recessed or apertured ahead of pin 7, as indicated at 8, and plate 6 terminates short thereof, the recess 8 being adapted to receive a latch mechanism, generally designated 9, carried by and comprising part of my new connection device, about to be described.

As in my earlier patents, the connection device has a stabilizing base plate 10 connected to the tractor floor 4 by a headed pivot pin 11, held in place by a nut 12, whereby plate 10 is mounted for rotation relative to the tractor floor about a normally upright axis. To facilitate such rotation, several rollers 13 are journaled in depressed areas 14 of the floor 4, and are arranged to support the plate 10 for rotation thereof.

Paired bracket members 15 are carried by the plate 10 and support a shaft 16 journaled therein. Shaft 16 extends transversely of the trailer at all times during normal operation, as will become apparent, and crank arms 17 are carried by the opposite ends thereof. Support arms 18 are carried by crank arms 17 and extend upwardly above the shaft 16 into supporting engagement with a trailer mounting plate 19 which can be in the nature of a standard fifth wheel. Plate 19 is of conventional fifth wheel design in many respects, having an approximately circular flat plate portion with laterally spaced rearward extensions 20 inclined downwardly and forming therebetween a forwardly converging, V-like passage merging into a relatively narrow slot 21, at substantially the center of the circular portion of the plate. King pin 7 is locked within slot 21 by a conventional locking arrangement carried by the plate 19, comprising for example pivoted jaw members 22 manually operable by means of a lever 23 (FIG. 4).

Support arms 18 and crank arms 17 together comprise articulated supported members mounting the plate 19 on stabilizing plate 10 for rocking movement about the axis of shaft 16, for shock absorbing purposes, and shock absorbing members 24 having shock pads 25 spring pressed outwardly therefrom to engage the articulated support members and thereby limit forward rocking of a connected trailer are carried by the plate 10.

It will be apparent that when the tractor pulls the trailing vehicle the load is taken primarily by the base plate pivot pin 11, although of course rollers 13 receive a portion of the load and distribute it around the plate 10. While only a simple pivot pin connection has been shown at 11, for ease of illustration, it will be appreciated that in actual practice such a pin will be bushed, in a manner known per se, to facilitate rotation. In either event, wear occurs, and it is desired to provide reinforcing bearing support taking a portion of the bearing load and thereby relieving the strain on the pivot pin.

In accord with my present invention, this is accomplished by a bearing plate 26 mounted on the tractor floor 4 rearwardly of the stabilizing base plate 10, and having a concave bearing face 27 extending into bearing engagement with the rearward edge portion of the plate 10. As a result of the bearing support provided by the surface 27 of plate 26, part of the rearward thrust on base plate 10 and pin 11 is taken by the bearing plate 26 which is secured to the tractor floor by means of bolts 28, whereby the load upon the pivot pin 11 is effectively reduced. It will be appreciated that the bearing surface 27 can, if desired, be provided with an appropriate surfacing material, and that relatively rotating base plate 10 has sliding bearing engagement with plate 26.

To compensate for wear upon the bearing plate 26 I provide the same with slots 29 through which the bolts 28 extend, and which permit the plate to be moved toward pin 11 as the surface 27 wears, thereby to provide effective bearing support for a long time. If the plate should ever finally wear to the point where it is no longer useable, it is readily replaceable by simply removing bolts 28.

Therefore, the problem of pivot pin bearing support is solved by this invention in a highly effective manner. In addition, bearing plate 26 provides a stop to limit rotation of plate 10 relative to tractor 1, preferably at about 95° in either direction. To this end, a pair of stop members 30 are secured to plate 10, as by welding, at a position such that upon rotation of plate 10 relative to tractor 1 through approximately 95° in either direction, the appropriate stop 30 engages plate 26, as illustrated in FIGS. 1 and 5, for example, to preclude further rotation and consequent damage to the tractor cab by the trailing vehicle.

In normal operation, the trailer is locked against rotation relative to its mounting plate 19, so that relative rotation is confined to base plate 10 and tractor 1, and so that shaft 16 stays alined transversely of the trailer. To this end, there is provided the latch mechanism 9 which includes a box-like housing 31 welded or otherwise secured to the mounting plate 19 and reinforced as by the plates 32. The latch mechanism has a latch member 33 which is confined within housing 31 and which is normally urged to a latching position with its trailer engaging head portion projecting above mounting plate 19 by means such as a pair of coil springs 34 which are similarly confined within the housing 31. Springs 34 bear at one end against the trailer engaging head portion of latch member 33 and at their opposite end against a bottom plate 35 carried by housing 31. The latch member is anchored in the housing by means of a bolt 36 secured thereto and extending through housing 31 and bottom wall 35 into engagement with a clevis 37, to which one end of an actuating lever 38 is pivotally connected by a pin 39. Lever 38 is pivotally supported intermediate its ends on a bracket 40 carried by housing 31, and extends laterally outwardly for convenient manipulation by the operator. A bracket 41, carried by plate 19, is provided to receive and retain the outer end of handle 38 when it is desired to hold the latch member retracted, the handle 38 being sprung over the end of bracket 41, as illustrated in FIG. 3, for engagement with and disengagement from bracket 41. Springs 34 are effectively housed, and latch member 33 is guided, by means of side walls 42 and a front wall 43, comprising part of latch member 33 and extending around the front and opposite sides of the housing bottom wall 35.

To facilitate automatic latching engagement of latch 33 with the trailer, the rear of the latch head portion comprises an upwardly and forwardly inclined cam surface 44, whereby the tractor can be simply driven under the trailer, to cause the king pin to engage in the slot 21 and the latch 33 to cam into engagement with the recess 8. To further facilitate this maneuver, the opposite sides of the latch head portion also are upwardly and inwardly inclined, to provide cam surfaces 45, whereby the tractor need not necessarily approach the trailer head on, to cause automatic engagement of the latch, but can approach at an angle. To further facilitate automatic latching when the tractor approaches at an angle other than 180°, the side cam surfaces taper rearwardly, as shown in FIGS. 1 and 3. To facilitate unlatching, when the king pin lock has been released, the front surface of the latch head also can be an upwardly and inwardly, or rearwardly inclined cam surface 46 (FIGS. 1, 3 and 4), enabling the tractor to automatically unlatch without releasing the latch and holding it in unlatched position.

However, in some instances such automatic unlatching will not be desired, and in such cases the latch member can be shaped as indicated at 33' in FIG. 7. Latch member 33' has inclined rear and side walls much the same as those of latch member 33, to facilitate automatic latching as described above. However, the front wall 46' of latch member 33' is substantially vertical to comprise a positive stop, whereby the trailer 2 cannot be unlatched from tractor 1 until lever 38 has been manipulated to retract latch member 33' out of its latching position illustrated in FIG. 7. With this construction, the trailer cannot accidently become unlatched from the tractor, even if the king pin 7 or its lock 22 should break or disengage, thereby providing an extra margin of safety.

It will be seen that, with this construction, automatic latching engagement is readily accomplished, even where it is difficult, if not impossible, to align the tractor with the trailer for a straight on approach. The convenience of this is obvious, and it results from the use of cam surfaces on opposite sides of the latch member, and particularly the rearwardly tapering cam surfaces in plan view.

In addition, to cushion the shock whenever the trailer swings laterally and engages either side of the latch, which might occur during latching engagment at an angle and during jack-knifing, I provide a resiliently yieldable lateral support, preferably in the form of a cushion 47, which can be of rubber, carried within housing 31 on opposite sides of the latch 33. The cushions 47 can be protected against tearing by plates 48 extending along the inner sides and partially across the tops thereof (FIG. 3A), and are carried by bottom wall extensions of housing 31, whereby the cushions are to a large extent enclosed. As a result, if the latch 33 is struck and shifted laterally it will be cushioned by the members 47 which provide a resiliently yieldable, cushioned stop. This greatly reduces the strain on the latch, as well as on the trailer floor and other parts, thereby contributing to longer life. When either stop 30 engages plate 26 to prevent further rotation of plate 10 on the tractor floor, any further relative rotation is transferred to the connection between latch 33 or 33' and the trailer, and the resiliently yieldable cushions 47 provide, in either case, a cushioned stop as distinguished from a rigid and relatively unyielding stop.

Accordingly, it is seen that my invention fully accomplishes its intended objects, and while only a presently preferred embodiment and one modification of the latch have been described in detail, it will be appreciated that such detailed description is intended to be by way of illustration, without limitation as to the scope of my invention which I intend to be defined by the appended claims.

Having fully disclosed and completely described my invention, and its mode of operation, what I claim as new is:

1. In combination, a tractor, a trailer, and a connection device for coupling said trailer to said tractor comprising, base plate means, pivot pin means securing said base plate means to said tractor for rotation relative thereto about a normally generally upright axis, trailer mounting plate means carried by said base plate means for rotation therewith relative to said tractor, latch means releasably securing said trailer against rotation relative to said mounting plate means, bearing plate means carried by said tractor rearwardly of said base plate means, said bearing plate means having a surface in bearing engagement with the rear edge portion of said base plate means and adjustable toward and away from said pivot pin means, and means holding said bearing plate surface in adjusted position.

2. A connection device as set forth in claim 1, together with stop means carried by said base plate means for movement therewith into engagement with said bearing plate means, thereby to limit rotation of said base plate means relative to said tractor.

3. The combination set forth in claim 1, wherein said latch means are laterally resiliently yieldable to permit very limited rotation of said trailer relative to said mounting plate means, and positive stop means carried by said base plate means for engagement with said bearing plate means to limit rotation of said base plate means relative to said tractor.

4. A tractor-trailer connection device comprising, in combination with a tractor, base plate means pivotally connected to said tractor for rotation relative thereto about a normally generally upright axis, trailer mounting plate means carried by said base plate means for rotation therewith about said axis relative to said tractor, and latch means carried by said mounting plate means for holding a connected trailer against rotation relative thereto, said latch means including a latch member spring-biased to project upwardly above said mounting plate means into latching engagement with a connected trailer, and resiliently yieldable cushioning means laterally supporting said latch member on opposite sides thereof.

5. A tractor-trailer connection device comprising, in combination with a tractor, base plate means pivotally connected to said tractor for rotation relative thereto about a normally generally upright axis, trailer mounting plate means carried by said base plate means for rotation therewith about said axis relative to said tractor, and latch means carried by said mounting plate means for holding a connected trailer against rotation relative thereto, said latch means including a latch member having a trailer-engaging portion spring-biased to project above said mounting plate means into latching engagement with a connected trailer, said latch member trailer-engaging portion having upwardly and inwardly inclined cam surfaces at the rear and opposite sides thereof.

6. A tractor-trailer connection device as set forth in claim 5, wherein the front of said latch member trailer-engaging portion also has an upwardly and inwardly inclined cam surface.

7. A tractor-trailer connection device as set forth in claim 5, wherein the front of said latch member trailer-engaging portion extends at substantially a right angle to said mounting plate means to provide a positive stop against disengagement of a connected trailer.

8. A tractor-trailer connection device as set forth in claim 5, wherein the cam surfaces at the opposite sides of said latch member trailer-engaging member taper rearwardly.

9. A tractor-trailer connection device as set forth in claim 5, together with resiliently yieldable means laterally supporting said latch member.

10. A tractor-trailer connection device comprising, in combination with a tractor, base plate means pivotally connected to said tractor for rotation relative thereto in a normally generally horizontal plane, trailer mounting plate means carried by said base plate means for rotation therewith relative to said tractor, and latch means carried by said mounting plate means for holding a connected trailer against rotation relative thereto, said latch means including a latch member spring-biased to project upwardly above said mounting plate means into latching engagement with a connected trailer, and resiliently yieldable cushioning means laterally supporting said latch member on opposite sides thereof.

11. A tractor-trailer connection device comprising, in combination with a tractor, base plate means pivotally connected to said tractor for rotation relative thereto in a normally generally horizontal plane, trailer mounting plate means carried by said base plate means for rotation therewith relative to said tractor, and latch means carried by said mounting plate means for holding a connected trailer against rotation relative thereto, said latch means including a latch member having a trailer-engaging portion spring-biased to project above said mounting plate means into latching engagement with a connected trailer, said latch member trailer-engaging portion having upwardly and inwardly inclined cam surfaces at the rear and opposite sides thereof.

References Cited in the file of this patent
UNITED STATES PATENTS

| | | |
|---|---|---|
| 2,188,727 | Soulis | Jan. 30, 1940 |
| 2,462,211 | Moore | Feb. 22, 1949 |
| 2,670,220 | Colpo | Feb. 23, 1954 |
| 2,712,948 | Conaway | July 12, 1955 |
| 2,843,398 | Apgar | July 15, 1958 |